Nov. 16, 1948.  R. C. ALLEN  2,454,115

TURBINE BLADING

Filed April 2, 1945

Inventor
Robert C. Allen by K. S. Wyman
Attorney

Patented Nov. 16, 1948

2,454,115

UNITED STATES PATENT OFFICE 2,454,115

TURBINE BLADING

Robert C. Allen, Wauwatosa, Wis., assignor to Allis-Chalmers Manufacturing Company, Milwaukee, Wis., a corporation of Delaware Application April 2, 1945, Serial No. 586,110

7 Claims. (Cl. 253—77)

This invention relates generally to turbine blading and more particularly to a blade and lashing construction for reinforcingly connecting or uniting intermediate portions of pairs of relatively long blades.

In this connection, a common practice is to provide an intermediate portion of each blade with an integral laterally extending projection adapted to end-abut the opposed face of the next adjacent blade or with oppositely extending projections disposed in either end abutting or opposed spaced relation with respect to the projections on the next adjacent blade and to fusibly or mechanically unite the adjacent end portions of same. In constructions in which the width of the projection or projections conforms with the width of the working face of the blade, a common expedient is to unite the projections and blades by welding, brazing or soldering a circumferentially extending lacing wire to either one or both side edges of the projections and blades. Another common practice is to provide an intermediate portion of each with a hole or opening therethrough adapted to be alined with the similarly disposed hole or opening in the next adjacent blade or blades and to unite the blades in groups of three or more by threading a lacing wire through the alined openings in the blades and mechanically or fusibly uniting the wire to the blades, or in pairs by inserting a rivet member having reduced end portions between a pair of blades with the reduced end portions of the rivet extending through the openings in the blade and with the enlarged intermediate portion of the rivet abutting the opposed working faces of the blades. Still another and more recent practice is to provide an intermediate portion of each blade with a pair of integral oppositely extending projections disposed in overlapped spaced relation with respect to the projections on the next adjacent blades and to rivet together the overlapped portions of the projections.

However, the first mentioned practice is not entirely satisfactory in that a fusible union of the projections, whether directly or indirectly by means of a lacing wire or the like, does not produce connections of uniform strength, and in addition, the performance of the necessary welding, brazing and heat treating operations on blades of nickel-chrome composition invariably heats the integral projections and sometimes the blade proper, sufficiently to produce a detrimental degree of grain growth and a consequent weakening of the structure, and in that the types of mechanical connections heretofore employed resulted in a material weakening of the projections or of the blade structures or of both. The second mentioned practice has not proven satisfactory and is now rarely if ever used because the provision of a hole through an intermediate portion of an ordinary blade materially weakens same and because the strength of the blade is in no manner restored by the lacing wire or rivet bracing connections heretofore employed. The last mentioned practice is also not entirely satisfactory in that the spacing between the overlapped portions of the projections varies materially and necessitates a complicated assembly procedure in order to properly fit spacing pieces therebetween, and in that the rivet is subjected to large shear stresses due to the tendency of the blades to fan out or spread apart at high peripheral speeds.

In fact, all of the prior constructions hereinbefore mentioned and reduced to practice present difficult and costly assembly procedures and invariably result in connections which vary materially with respect to strength and reliability. And it is therefore an object of this invention to provide an improved blade and lashing construction for mechanically uniting the opposed intermediate portions of a pair of relatively long blades in that the mechanical connection of the blades can be readily effected with a minimum of skill, time and effort, in that the resulting connection between pairs of blades is extremely and uniformly strong and durable, and in that the blades and the separable parts of the lashing structure can be readily manufactured at a competitive cost.

The construction and application of apparatus embodying the invention and the significance of the aforementioned and other objects will become readily apparent as the disclosure progresses and particularly points out features deemed to be of special importance. And accordingly the invention may be considered as consisting of the various details of construction, combinations of elements and arrangements of parts as is more fully set forth in the appended claims and in the detailed description, reference being had to the accompanying drawing, in which:

Figure 1:
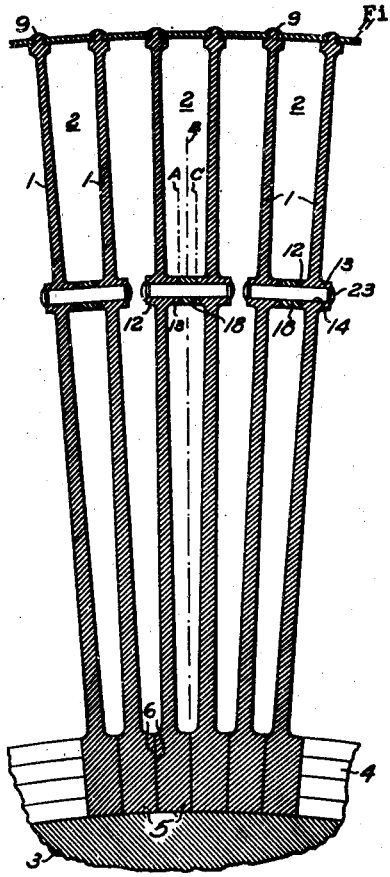
Fig. 1 is a section taken through part of a rotor mounted circumferential blade row embodying the invention.

Referring to Fig. 1 of the drawing, it is seen that blades 1 united in pairs 2 in accordance with this invention may be mounted on a rotor 3 provided with a conventional blade root receiving and retaining groove 4, that the blades 1 have similarly enlarged, conventional root parts 5 presenting single-surfaced end portions 6 disposed in end-abutting engagement to thereby position the opposed faces or side surfaces 7 and 8 of the blades of each pair and of the adjacent blades of abutting pairs in correctly spaced, passage forming relation, and that the tip portions of the blades 1 may be provided with integral tenons 9 and with an apertured shroud band or strip 11 through which the tenons project and are peened thereover in order to secure the shroud strip to the ends of the blades. Whether the blades are shrouded as just described or in some other known manner is purely a matter of choice, and, if desired, the shroud structure may be entirely omitted as it forms no part of the present invention.

Figure 3:
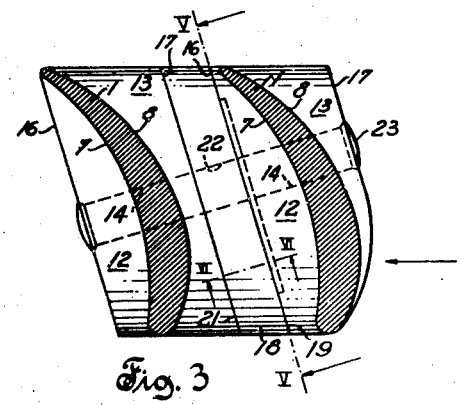
Fig. 3 is a view taken on line III—III of Fig. 2.
Figure 2:
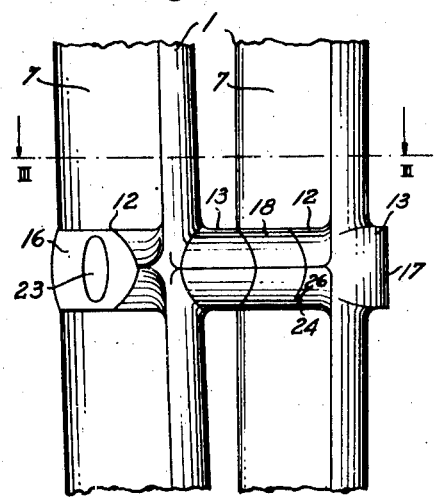
Fig. 2 is an enlarged front elevation of an intermediate portion of a pair of blades united as shown in Fig. 1.
Figure 4:
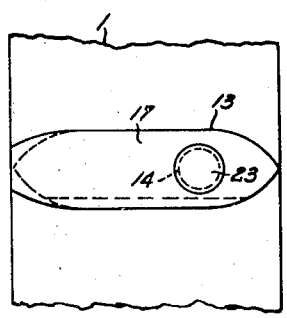
Fig. 4 is an end elevation of the structure shown in Fig. 2 as seen when looking in the direction indicated by the arrow thereon.
Figure 5:
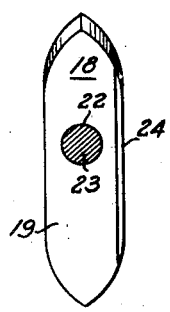
Fig. 5 is a section taken on line V—V of Fig. 3.
Figure 6:
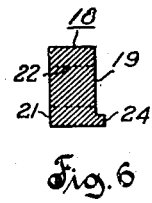
Fig. 6 is a section taken on line VI—VI of Fig. 3.

Referring more particularly to Figs. 2–6, inclusive, it is seen that in accordance with this invention the blades of each pair have opposed portions, remote from their root parts or base portions, laterally enlarged sufficiently to practically nullify the strength-reducing effect of providing each blade with a rivet-receiving hole or aperture extending through the enlarged portion of the blade from one side thereof to the other and sufficiently to provide each blade with a pair of integral oppositely extending alined projections 12 and 13, that each blade is provided with a rivet-receiving hole 14 extending through the enlarged portion of the blade from one side thereof to the other in the general direction best shown in Fig. 3 with the rivet holes in each pair of blades disposed in substantial alinement, that each of the projections 12 and 13 have plain end surfaces or end surface portions 16 and 17 which may or may not be made plane and parallel in order to simplify machining operations, that the projections on the opposed faces of each pair of united blades are disposed in spaced, end-opposed relation with the longitudinal axes of the alined rivet-receiving holes approximately normal with respect to the plain end surfaces 16 and 17 (see Fig. 3), that the space or gap between the plain surface portions 16 and 17 presented by the end-opposed projections 12 and 13 of the blades of each pair is filled with a spacer or filler piece 18 having oppositely facing plain surfaces or surface portions 19 and 21 complementary to and coextensively abutting the opposed plain end surface portions 16 and 17, respectively, and having an aperture or hole 22 therethrough alined with the holes 14 extending through the enlarged portions of the blades, and that the blades and the interposed filler piece are rigidly united by a rivet or the like 23 which passes through the alined holes 14 and 22 and has its opposite ends enlarged to form retaining head portions.

In this connection, it is preferable, in the interest of simplifying the manufacture of blades adapted to be united in accordance with this invention, to make the plain surfaces 16 and 17 on end-opposed projections 12 and 13 and consequently the complementary surfaces 19 and 21 on filler piece 18 parallel with respect to each other and with respect to the plain, end-abutting surfaces or surface portions 6 of root parts 5 as is indicated on Fig. 1 by lines A, B and C with respect to which line B represents the plane of the abutted end-surface portions 6 of root parts 5, line A is parallel to line B and represents the plane of the abutted surface portions 17 and 21 of projection 13 and filler piece 18, and line C, which is parallel to both lines A and B, represents the plane of the abutted surface portions 16 and 19 of projection 12 and filler piece 18. Moreover, it is usually desirable in the interest of simplicity, although in no manner essential insofar as the broad aspects of the invention are concerned, to make the plain, rivet-head-engaged surface portions of projections 12 and 13 parallel or substantially parallel to the plain surface portions which abut opposite sides of the filler piece 18. Furthermore, it is also desirable in the interest of obtaining good flow efficiency to streamline the edges of projections 12 and 13 and of filler piece 18 along the lines indicated in Figs. 2, 4 and 5, and to remove or cut away the inlet edge portion of the outer projection 13, i. e., the projection 13 which is engaged by a head-end-portion of rivet 23, as is clearly indicated in Fig. 3. In addition, it may be desirable in the event some degree of looseness develops between filler piece 18 and the projections abutting same to provide the filler piece and at least one of the projections abutting same with suitably engaged portions, such, for example, as a tongue 24 on filler piece 18 and a complementary groove or recess 26 in the abutting surface 16, which coact to prevent the filler piece from turning relative to the projections 12 and 13.

The construction of blades and filler pieces in accordance with this invention permits end-machining the integral projections on the opposed faces of blades, which are to be united in pairs, to a desired length determined by measuring the distance their plane end surfaces, i. e., the surfaces which are adapted to abut the oppositely facing plain side surfaces of filler piece 18, are spaced from a common reference plane, the plane of the end abutted root surface portions 6 represented by line B of Fig. 1, thereby minimizing variations in the distance between the plain end-opposed surfaces presented by such projections and the number of different sized filler pieces which must be made and stocked for assembly purposes. In addition, the construction of blades in accordance with this invention minimizes the number of cutting and/or grinding operations necessary in order to produce blades with a portion remote from their root parts laterally enlarged and apertured to provide integral oppositely extending projections having a practical configuration and a width and thickness sufficient to substantially nullify the strength-reducing effect of providing each blade with a rivet-receiving aperture or hole extending through the enlarged portion of the blade from one side through to the other. Moreover, blades and filler pieces constructed in accordance with this invention can be readily assembled in pairs and united by a cold riveting procedure prior to the mounting of same on a rotor or stator element thereby producing a connection between pairs of blades which is extremely and uniformly strong and durable.

The invention is generally applicable to all types of relatively long blades having enlarged root parts presenting one or more plain root surface portions disposed in end-abutting relation, and although the invention is illustrated as applied to blades having enlarged root parts presenting only single-surfaced abutting end portions, it should be understood that it is not desired to limit the invention to exact details of construction and arrangements of parts herein shown and described for purposes of illustration as various modifications within the scope of the appended claims may occur to persons skilled in the art.

It is claimed and desired to secure by Letters Patent:

1. In a turbine rotor or the like provided with a row of relatively long blades each having an enlarged root part presenting plain oppositely facing surfaces abuttingly engaged with the like root-part surfaces on adjacent blades to thereby position the opposed fluid confining faces of the blades in correctly spaced passage-forming relation, means rigidly uniting said blades in pairs with their opposed fluid confining faces disposed in correctly spaced passage-forming relation as determined by the abutting engagement of their said root parts comprising a part of each blade remote from its root part enlarged so as to provide a pair of oppositely extending alined integral projections, said projections presenting plain end surface portions disposed in spaced opposed relation with respect to the plain end surface portions of the projections on adjacent blades, said blades each having a rivet-receiving hole intersecting the respective plain end surface portion and extending through the enlarged portion of the blade through the other side thereof with the holes through adjacent blades disposed in substantial alinement, a filler piece disposed between and end-abutting the spaced opposed end surface portions of the projections presented by the opposed faces of each pair of blades, said filler piece having a hole therethrough alined with the holes extending through the projections abutting same, and a rivet member extending through said alined holes and rigidly uniting each pair of blades with the projections on the opposed faces thereof disposed in firm end-abutting engagement with the opposite ends of the filler piece interposed therebetween.

2. In combination, a pair of relatively long blades having enlarged root parts presenting plain end-surface portions disposed in abutting relation and having opposed portions remote from their root parts laterally enlarged sufficiently to practically nullify the strength-reducing effect of providing each blade with a rivet-receiving hole extending through the enlarged portion of the blade from one side thereof to the other and so as to provide the blades with integral oppositely extending projections having plain end surfaces with the projections on opposed faces of the blades disposed in spaced, end-opposed relation, said blades each having a rivet-receiving hole extending through the enlarged portion of the blade and intersecting the remote oppositely facing end surfaces of its projections with the rivet holes of the blades disposed in substantial alinement, the oppositely facing plain end surfaces of the projections of a blade being substantially normal to the axis of said rivet holes, a filler piece between said projections having oppositely facing plain surface portions substantially coextensive with and abutting the plain end-surface portions presented by the projections on the opposed faces of the blades and having a hole therethrough alined with the holes extending through the laterally enlarged portions of the blades, and a rivet member extending through said alined holes and rigidly uniting said blades with the projections on the opposed faces thereof disposed in firm end-abutting engagement with the opposite ends of said filler piece.

3. In combination, a pair of relatively long blades having enlarged root parts presenting plain generally radially extending end-surface portions disposed in abutting relation and having opposed portions remote from their root parts laterally enlarged sufficiently to practically nullify the strength-reducing effect of providing each blade with a rivet-receiving hole extending through the enlarged portion of the blade from one side thereof to the other and so as to provide the blades with integral projections, having plain end surfaces, disposed in spaced opposed relation, said blades each having a rivet-receiving hole intersecting the respective plain end surface and extending through the enlarged portion of the blade through the other side thereof with the rivet holes of the blades disposed in substantial alinement, said plain opposed end surfaces being substantially parallel with respect to each other and with respect to the plain abutting surface portions of said root parts, a filler piece between said projections having oppositely facing plain parallel surface portions substantially coextensive with and abutting the plain opposed end surface of the projections and having a hole therethrough alined with the holes extending through the laterally enlarged portions of the blades, and a rivet member extending through said alined holes and rigidly uniting said blades with the projections on the opposed faces thereof disposed in firm end-abutting engagement with the opposite ends of said filler piece.

4. In combination, a pair of relatively long blades having enlarged root parts presenting plain generally radially extending end-surface portions disposed in abutting relation and having opposed portions remote from their root parts laterally enlarged sufficiently to practically nullify the strength-reducing effect of providing each blade with a rivet-receiving hole extending through the enlarged portion of the blade from one side thereof to the other and so as to provide the blades with integral oppositely extending alined projections with the projections on opposed faces of the blades having plain end surfaces disposed in spaced opposed relation, said blades each having a rivet-receiving hole intersecting the respective plain end surface and extending through the enlarged portion of the blade through the other side thereof with the rivet holes of the blades disposed in substantial alinement, said opposed plain end surfaces being substantially parallel with respect to each other and with respect to the plain abutting root surface portions and substantially normal with respect to the axis of said holes, a filler piece between said projections having oppositely facing plain parallel surface portions substantially coextensive with and abutting the plain end surfaces of the projections on the opposed faces of the blades and having a hole therethrough alined with the holes extending through the laterally enlarged portions of the blades, and a rivet member extending through said alined holes and rigidly uniting said blades with the projections on the opposed faces thereof disposed in firm end-abutting engagement with the opposite ends of said filler piece.

5. In combination, a pair of relatively long blades having enlarged root parts presenting plain generally radially extending end-surface portions disposed in abutting relation and having portions remote from their root parts laterally enlarged sufficiently to practically nullify the strength-reducing effect of providing each blade with a rivet-receiving hole extending through the enlarged portion of the blade from one side thereof to the other and so as to provide each blade with a pair of integral oppositely extending alined projections approximately coextensive with the width of the blades with the projections on the opposed faces of the blades having plain end surfaces disposed in spaced opposed relation, said blades each having a rivet-receiving hole intersecting the respective plain end surface and extending through the enlarged portion of the blade through the other side thereof with the rivet holes of the blades disposed in substantial alinement, said opposed plain end surfaces being substantially parallel with respect to each other and with respect to the plain abutting end surface portions of said root parts, a filler piece between said spaced opposed projections having oppositely facing plain parallel surface portions substantially coextensive with and abutting the plain end surfaces of the projections on the opposed faces of the blades and having a hole therethrough alined with the holes extending through the laterally enlarged portions of the blades, and a rivet member extending through said alined holes and rigidly uniting said blades with the projections on the opposed faces thereof disposed in firm end-abutting engagement with the opposite ends of said filler piece, said filler piece and at least one of said end opposed projections having engaged portions coacting to prevent the filler piece from turning relative to the projections abutting same.

6. In combination, a pair of relatively long blades having enlarged root parts presenting plain end-surface portions disposed in abutting relation and having opposed portions remote from their root parts laterally enlarged sufficiently to practically nullify the strength-reducing effect of providing each blade with a rivet-receiving hole extending through the enlarged portion of the blade from one side thereof to the other and so as to provide the blades with integral projections having plain end-surface portions disposed in spaced opposed relation, said blades each having a rivet-receiving hole intersecting the plain end surface portion of the respective integral projection and extending through the enlarged portion of the blade through the other side of said enlarged portion, with the rivet holes disposed in substantial alinement, a filler piece between said projections having oppositely facing plain surface portions substantially coextensive with and abutting the plain end-surface portions presented by the projections and having a hole therethrough alined with the holes extending through the laterally enlarged portions of the blades, and a rivet member extending through said alined holes and rigidly uniting said blades with the projections on the opposed faces thereof disposed in firm end-abutting engagement with the opposite ends of said filler piece.

7. In combination, a pair of relatively long blades having enlarged root parts presenting plain end-surface portions disposed in abutting relation and having opposed portions remote from their root parts lateraly enlarged sufficiently to practically nullify the strength-reducing effect of providing each blade with a rivet-receiving hole extending through the enlarged portion of the blade from one side thereof to the other and so as to provide the blades with integral projections having plain end-surface portions disposed in spaced opposed relation, said blades each having a rivet-receiving hole intersecting the plain end surface portion of the respective integral projection and extending through the enlarged portion of the blade through the other side of said enlarged portion, with the rivet holes disposed in substantial alinement, a filler piece between said projections having oppositely facing plain surface portions substantially coextensive with and abutting the plain end-surface portions presented by the projections and having a hole therethrough alined with the holes extending through the laterally enlarged portions of the blades, and a rivet member extending through said alined holes and rigidly uniting said blades with the projections on the opposed faces thereof disposed in firm end-abutting engagement with the opposite ends of said filler piece, said filler piece and at least one of said projections having engaged portions coacting to prevent the filler piece from turning relative to the projections abutting same.

ROBERT C. ALLEN.

REFERENCES CITED

The following references are of record in the file of this patent:

UNITED STATES PATENTS

| Number | Name | Date |
|---|---|---|
| 980,283 | Kallberg | Jan. 3, 1911 |
| 1,061,648 | Westinghouse | May 13, 1913 |
| 1,554,614 | Allen | Sept. 22, 1925 |
| 1,618,284 | Hodgkinson | Feb. 22, 1927 |
| 1,749,449 | Stevenson | Mar. 4, 1930 |

FOREIGN PATENTS

| Number | Country | Date |
|---|---|---|
| 49,119 | Denmark | July 31, 1934 |
| 176,350 | Great Britain | Feb. 23, 1922 |
| 393,333 | Germany | Apr. 1, 1924 |